United States Patent [19]

Gneuss

[11] Patent Number: 4,850,840
[45] Date of Patent: Jul. 25, 1989

[54] SCREENING DEVICE FOR PURIFYING PLASTIC MELTS

[75] Inventor: Detlef Gneuss, Bad Oeynhausen, Fed. Rep. of Germany

[73] Assignee: Gneuss Kunststofftechnik GmbH, Bad Oeynhausen, Fed. Rep. of Germany

[21] Appl. No.: 279,569

[22] Filed: Dec. 2, 1988

[30] Foreign Application Priority Data

Dec. 17, 1987 [DE] Fed. Rep. of Germany ... 8716626[U]

[51] Int. Cl.⁴ .................. B01D 35/12; B29C 47/68
[52] U.S. Cl. .................. 425/182; 210/234; 210/236; 425/185; 425/197; 425/199
[58] Field of Search ........... 425/182, 185, 197, 199, 425/186, 192 R, 190; 210/234, 236

[56] References Cited

U.S. PATENT DOCUMENTS

| | | | |
|---|---|---|---|
| 3,675,934 | 7/1972 | Heston | 425/199 X |
| 3,804,758 | 4/1974 | Cooper et al. | 425/197 X |
| 4,167,384 | 9/1979 | Shirato et al. | 425/192 R X |
| 4,265,756 | 5/1981 | Schiesser | 210/236 |
| 4,416,605 | 11/1983 | Konno et al. | 425/186 X |
| 4,468,322 | 8/1984 | Fogarty, Jr. et al. | 210/236 |
| 4,507,072 | 3/1985 | Gaul, Jr. | 425/185 |
| 4,588,502 | 5/1986 | Zibell et al. | 425/199 X |
| 4,619,600 | 10/1986 | Gneuss | 425/197 |
| 4,698,006 | 10/1987 | Ralphs | 425/190 X |
| 4,710,288 | 12/1987 | Patrovsky | 425/197 X |

FOREIGN PATENT DOCUMENTS 3443654 6/1987 Fed. Rep. of Germany .

Primary Examiner—Richard L. Chiesa
Attorney, Agent, or Firm—Michael J. Striker

[57] ABSTRACT

A screening device for a melt of plastic material includes a housing provided with a throughflow boring forming a part of a high pressure plastic press. A screen plate is movable transversely across the boring and includes a series of screening openings arranged at the level of the throughflow boring and being separated one from each other by a narrow web. To minimize the formation of pressure gradients in the throughflow boring when a new screening opening is entering the boring, each web has at its interface with the housing a narrow overflow slot which sets up a gradual connection for an inflow current of the melt during the entry of a new evacuated opening into the region of the throughflow boring.

10 Claims, 3 Drawing Sheets

SCREENING DEVICE FOR PURIFYING PLASTIC MELTS

BACKGROUND OF THE INVENTION

The present invention relates to a screening device for purifying melts of synthetic or plastic material to be fed into a high pressure plastic press. The screening device includes a housing having two opposite end walls, a throughflow boring extending transversely through the end walls and communicating with a feed channel of a high pressure plastic press, a plate or a disc supported for a shifting or a rotary movement in a gap between the end walls of the housing and being provided at the level of the throughflow boring with a series of at least four openings of which one is situated outside the housing while the remaining openings are situated within the housing, one of the openings within the housing being in alignment with the throughflow boring and the other two openings within the housing communicating with evacuation means, and either the throughflow boring or each of the openings in the series being provided with a screening disc.

A screening of the above described kind is known from the German Patent DE-PS No. 34 43 654. The objective of the prior art screening device of this kind is to guarantee the continuity of flow of the melted plastic material when a new opening of the movable plate or disc enters the area of the throughflow boring.

For this purpose, the screening device according to the German Patent DE-PS No. 34 43 654 is provided with the evacuating means which always evacuates each opening in the housing gap before its entry into the area of the throughflow boring.

However, in the construction of the device according to DE-PS No. 34 43 654 the new opening during the movement or rotation of the plate or disc in the housing gap enters the region of the throughflow boring without any transition. That means that the current of plastic melt passing through the boring momentarily develops a pressure gradient due to the fact that upon entry of a new opening in the throughflow boring the empty new opening must be first completely filled up with the melted plastic material.

The effect of the pressure gradient in many applications is not disturbing. However, in the case of extremely high requirements on the quality of processing, the aforementioned minute pressure gradient may cause noticeable disturbances or undesirable effects.

SUMMARY OF THE INVENTION

It is, therefore, a general object of the present invention to overcome the aforementioned disadvantages.

More particularly, it is an object of the present invention to provide an improved screening device of the above described kind wherein the pressure gradient in the range of the throughflow boring upon entry of a new opening during the rotation of the disc, is reduced to a practically insignificant value.

In keeping with these objects and others which will become apparent hereafter, one feature of this invention resides in the provision of a minute overflow slot in a trailing portion of the interface of each partition or web and the inner surface of the downstream end wall of the housing when viewed in the direction of movement of the plate and disc and in the direction of flow of the plastic melt, to set up a gradual connection or an inflow current of the melt during the entry of a new opening into the region of the throughflow boring.

Due to the structural measures a certain amount of preliminary flooding of the evacuated opening is achieved in the course of its entry into the throughflow boring already before their complete alignment.

Due to the fact that the overflow slot or slots are relatively small it is guaranteed that a pressure gradient which develops during the entry of a new opening into the range of the throughflow boring is substantially smaller in comparison with that developed in the prior art constructions. In practice, the unavoidable pressure gradient developed in the device of this invention has no effect on the operation of the high pressure plastic press.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
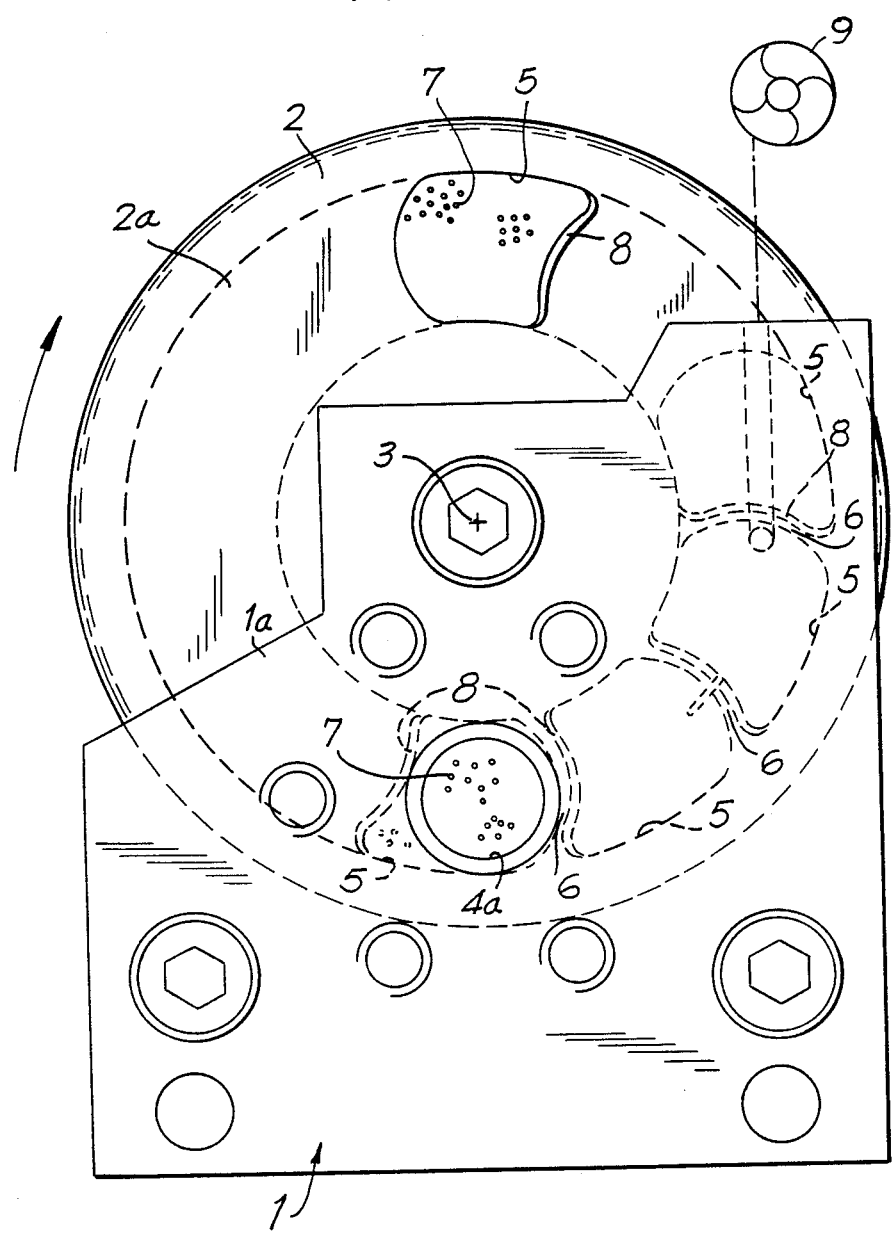
FIG. 1 is an elevational view in the throughflow direction of a screening device of this invention.
Figure 2:
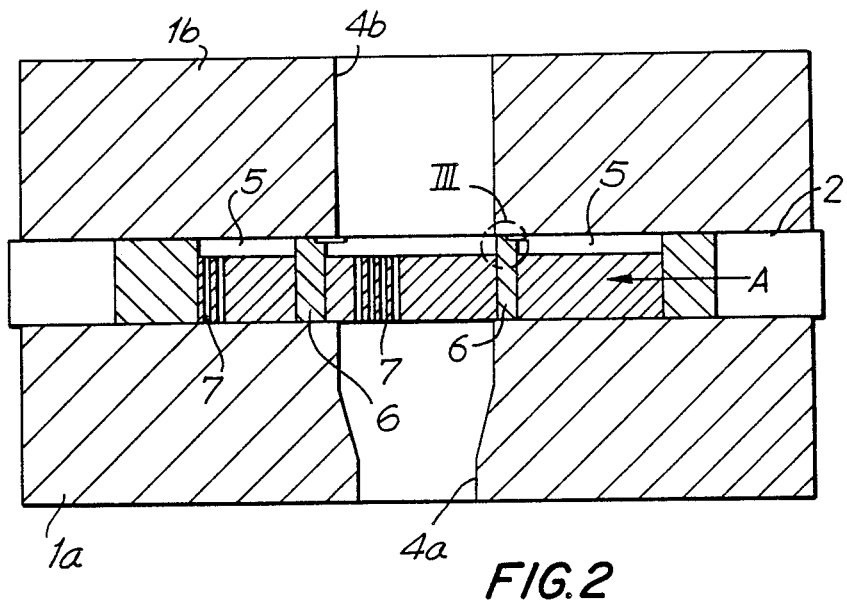
FIG. 2 is a sectional plan view of a portion of the device of FIG. 1 in the region of its throughflow boring.

Referring firstly to FIGS. 1 and 2, reference numeral 1 indicates a housing of a screening device for purifying melts of plastic material fed into a feed channel of a high pressure plastic press. The housing 1 includes two opposite end walls 1a and 1b defining a gap 1c therebetween. The end walls support for rotation about a central axis 3 a disc 2.

A lower part of the end housing walls 1a and 1b is provided with a throughflow boring 4a, 4b of which the downstream boring portion 4b forms a part of a feed channel of a high pressure plastic press.

An annular portion 2a of the disc 2 at the level of the througflow boring 4a, 4b is provided with a plurality of uniformly distributed openings 5 separated one from each other by partitions or webs 6.

It will be seen from FIG. 1 that the upper rim of housing 1 is lowered relative to the central axis 3 such that a part of openings 5 is continuously above the upper rim of the housing whereas the remaining number of openings is enclosed in the housing 1.

A perforated screen plate 7 is arranged in each of the openings 5. Alternatively, a perforated screen opening 7 can be arranged in the throughflow boring 4a.

One of the openings 5 is situated in alignment with the throughflow boring 4a, 4b. The next trailing opening 5 when viewed in the direction of movement of the disc or plate before its entry into the range of the boring 4a, 4b is evacuated in conventional manner by an evacuating device 9.

Figure 3:
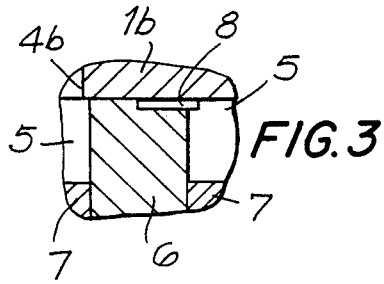
FIG. 3 shows on an enlarged scale the area III of FIG. 2 illustrating an embodiment of an overflow slot of this invention.

Referring to FIGS. 2 and 3, it will be seen that a trailing portion of the end face of each partition or web 6 which is in contact with the inner surface of the downstream end wall 1b of the housing, is slightly recessed over the entire length of the web so as to provide an overflow slot 8 which prior to the entry of the next opening 5' into the region of the boring 4a, 4b sets up a connection for a preliminary inflow current of the melt into the evacuated opening 5'.

Accordingly, as soon as the overflow slot 8 enters the range of the throughflow boring 4a, 4b a preliminary flooding of the next opening 5' to enter the boring, is initiated. Due to the fact that the overflow slot 8 has a relatively small cross-section, a correspondingly minute pressure gradient in the range of the throughflow boring 4a, 4b results.

Figure 4:
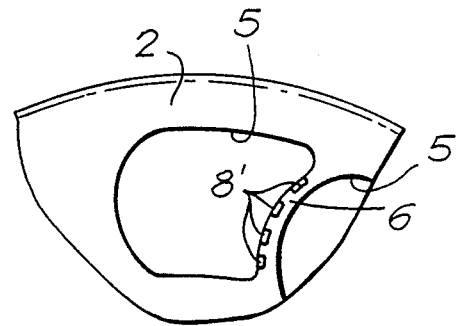
FIG. 4 is an elevation view of a "cut-away" portion of the rotary disc showing another embodiment of the screening device of this invention.

In a modification illustrated in FIG. 4, each partition or web 6 between the consecutive openings 5 can be provided with a row of slightly recessed partial slots resulting in a row of small overflow nozzles 8'. Even in this embodiment, the overflow nozzles 8 occupy only a part of the width of the end face of respective webs 6.

The depth of the recessed overflow slots 8 or overflow nozzles 8' in practice is between 0.1 to 0.3 mm when viewed in the direction of the throughflow boring 4a, 4b;

Due to the provision of the overflow slots or overflow nozzles 8 or 8' between the consecutive openings 5 the pressure gradient resulting in the range of the throughflow boring 4a, 4b during the entry of the next evacuated opening 5' is reduced to a practically negligible value. It will be noted that depending on the magnitude of the openings 5 and the throughflow boring 4a, 4b as well as on the rotary speed of the disc 2 or a shiftable plate, a person skilled in the art can adjust the dimension of the overflow slots or nozzles such as to obtain optimum results.

Figure 5:
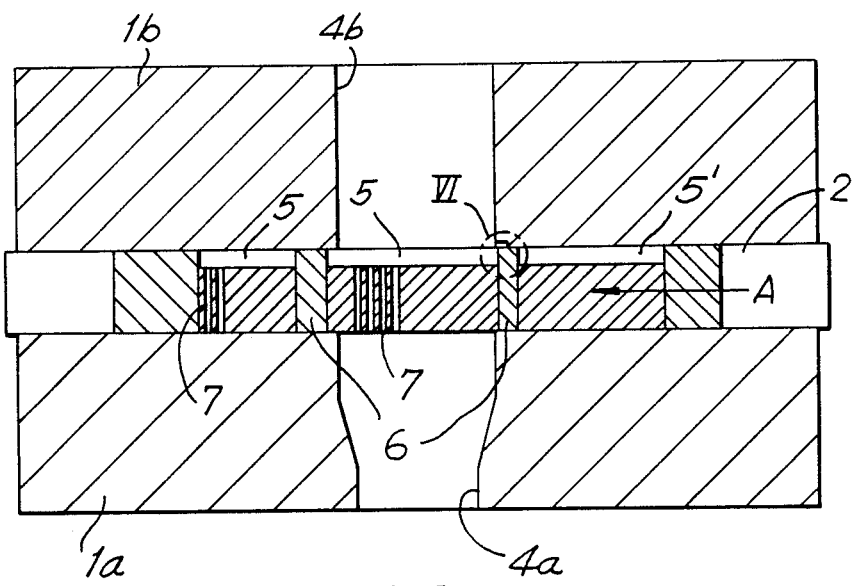
FIG. 5 is a sectional plan view similar to FIG. 2 of still another embodiment of the screening device of this invention.
Figure 6:
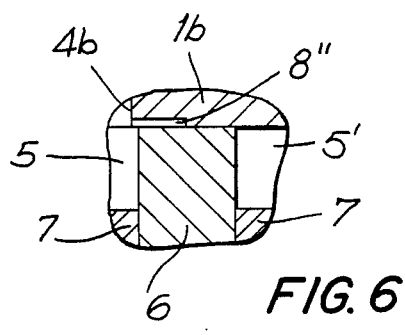
FIG. 6 shows on an enlarged scale the detail VI of FIG. 5.

From the manufacturing point of view, it is of advantage when the overflow slots 8 or overflow nozzles 8' have a configuration which extends parallel to the plane of the disc 2. Of course it is also possible to design the overflow slot 8 or overflow nozzles 8' in the form of a wedge or an inclined surface relative to the plane of the disc 2. FIGS. 5 and 6 illustrate an embodiment of the invention in which the overflow slot 8" is recessed in the edge region between the boring portion 4b and the inner surface of the end wall 1b of the housing. The length of the recessed overflow slot corresponds to a fraction of the width of the webs 6, as it will be seen from FIG. 6.

Of course, the overflow slots 8" in the embodiment of FIGS. 5 and 6 can be modified according to FIG. 4 to form a corresponding row of overflow nozzles in the edge area of the inner surface of the end wall 1b. Similarly as in the preceding examples, the arrow A indicates the direction of movement of the disc or plate 2.

While the invention has been illustrated and described as embodied in specific examples of the screening devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A screening device for purifying melts of synthetic material to be fed in a high pressure plastic press, including a housing having two opposite end walls, a throughflow boring extending through the end walls and forming a part of a feed channel of the plastic press, a plate supported for a shifting movement in a gap between the end walls of the housing and being provided at the level of the throughflow boring with a series of openings separated one from the other by partitions or webs each engaging inner surfaces of the end walls, each of the openings being provided with a screening plate, and means for evacuating those openings situated in the gap of the housing before the throughflow boring, comprising minute overflow slots formed in the interface of respective partitions or webs with a rim area of one of said end walls with said throughflow boring, said overflow slots setting up a connection for an inflow current of the melt during the entry of a new opening into the region of said throughflow boring.

2. A screening device as defined in claim 1, wherein a screening plate is arranged in said throughflow boring.

3. A screening device as defined in claim 1, wherein said housing continuously encloses at least three openings of which one is in alignment with said throughflow boring and two are situated before said throughflow boring and being evacuated by said evacuation means, and at least one of said openings being situated behind said throughflow boring and outside said housing.

4. A screening device as defined in claim 1, wherein the width of said overflow slot corresponds to a fraction of the width of said partitions or webs.

5. A screening device as defined in claim 4, wherein said overflow slot is formed by a series of discrete overflow nozzles.

6. A screening device as defined in claim 1, wherein said overflow slots are in the form of recesses whose width corresponds to a fraction of the width of said partitions or webs and whose depth when viewed in the axial direction of said throughflow boring, amounts to a maximum of 0.3 mm, preferably in the range between 0.1 to 0.2 mm.

7. A screening device as defined in claim 1, wherein said overflow slots extend substantially parallel to the plane of said screen plate or disc.

8. A screening device as defined in claim 1, wherein said overflow slots have a wedge-shaped cross-section inclined to the plane of said screening plate or disc.

9. A screening device as defined in claim 1, wherein said overflow slots are formed in a trailing portion of a contact surface of each partition or web with one of said end walls of the housing.

10. A screening device as defined in claim 1, wherein said overflow slots are formed in a rim area of one of said end walls of the housing with said throughflow boring.

* * * * *